Jan. 10, 1939.  J. MARKLEY ET AL  2,143,020
PEANUT BLANCHING MACHINE
Filed Sept. 24, 1936   3 Sheets—Sheet 3
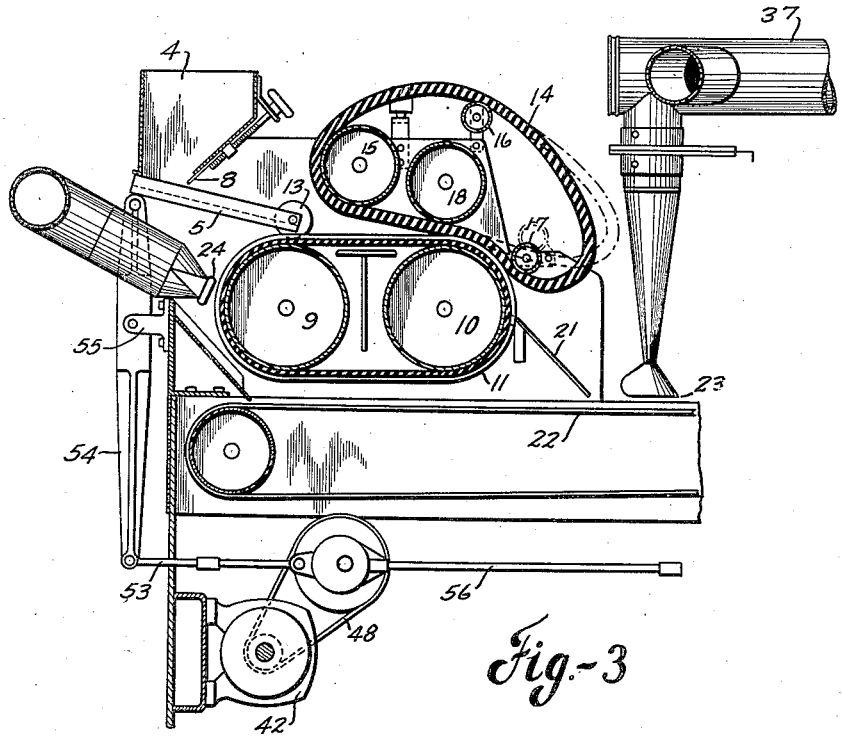
Fig.-3
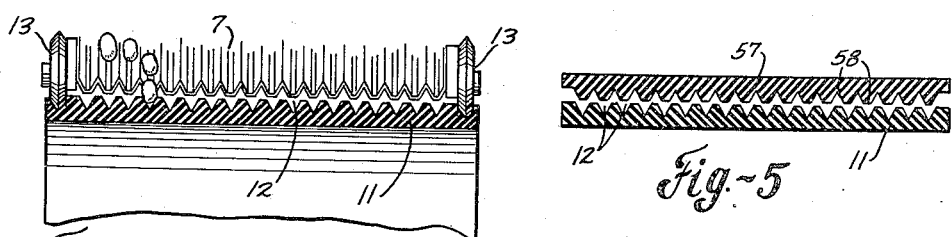
Fig.-4　　Fig.-5
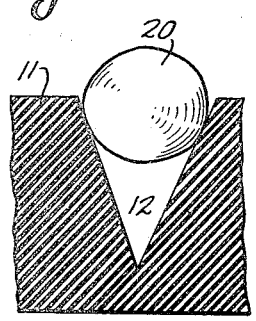　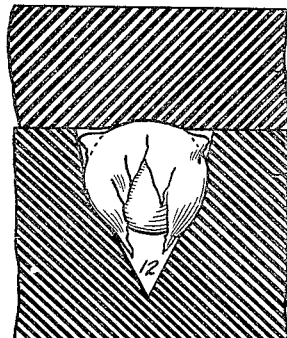
Fig.-6　　Fig.-7

Patented Jan. 10, 1939

2,143,020

UNITED STATES PATENT OFFICE 2,143,020

PEANUT BLANCHING MACHINE

Jonathan Markley, Maurice D. Woodruff, and William Mechlin, Springfield, Ohio, assignors to The Bauer Brothers Company, Springfield, Ohio, a corporation of Ohio Application September 24, 1936, Serial No. 102,352

27 Claims. (Cl. 146—32)

This invention comprises a method and apparatus for blanching nut kernels by removal of the epidermis, which, although particularly adapted for removal of the brown or red skins from peanut or ground nut kernels, otherwise known as goobers, the method and apparatus herein disclosed may be used for blanching other nuts, as for example, almonds, or for removing skins or coverings from other products.

While the skin of a peanut or goober after roasting is ordinarily loose and removable by manual manipulation, such blanching becomes a tedious and laborious process when performed commercially on large quantities of kernels.

The present invention provides for manipulation of the kernels between opposing tenacious yielding surfaces with which the kernels are preliminarily aligned, and which exert a retarding effect upon the skins while the kernel and the tenacious surfaces are being subjected to relative movement whereby the skin is ruptured by the kernel being forcibly thrust therethrough and the loosened skins are withdrawn by air blast while the denuded kernels are distributed over a sorting table for manual removal of non-commercial kernels after which they are graded by separation of pieces and halves from the whole nut kernels.

The purpose of the invention is to provide an apparatus for mechanically removing the skins from such nuts in commercial quantities which may not only be economically manufactured, but will be highly efficient in use, automatic in operation, uniform in action, and unlikely to get out of repair.

A further and highly important object of the invention is to provide a method of removing the skins from nut kernels effectively, rapidly and gently without abrasion of the kernel, with minimum breakage and splitting and by which the meat content of the kernel will be conserved.

A further object of the invention is to provide a method of mechanical manipulation by which the skin of the kernel will be initially ruptured and subsequently withdrawn.

A further object of the invention is to provide mechanical yielding pressure means to which the kernels are subjected for rupture of the enclosing skins.

A further object of the invention is to provide a method of manipulating the kernels between tenacious yielding surfaces by which the skins are stripped therefrom.

A further object of the invention is to provide feeding and aligning means whereby the kernels are consecutively fed to the machine in predetermined relation with the blanching elements.

A further object of the invention is to provide an air blast system for removing skins and foreign material at successive stages of operation.

A further object of the invention is to provide in association with the blanching means a traveling sorting table over which the blanched nuts are carried for inspection and cleaning.

A further object of the invention is to provide suitable grading means by which broken and halved nuts and kernel hearts are separated from the whole kernels.

A further object of the invention is to provide a nut blanching apparatus embodying the advantageous structural features and a method of operation having the meritorious characteristics herein mentioned.

With the above primary and other incidental objects in view as will more fully appear in the specification, the invention consists of the features of construction, the parts and combinations thereof, and the mode of operation, or their equivalents, as hereinafter described and set forth in the claims.

In the drawings, wherein is illustrated the preferred, but obviously not necessarily the only form of embodiment of the invention;

Fig. 3 is a longitudinal sectional view somewhat diagrammatic illustrating the relation of the parts and course of the kernels and detached skins.

Fig. 4 is a transverse sectional view of the feeder tray and blanching belt.

Fig. 5 is a detail view of a modification for operating on kernels of smaller size.

Figs. 6 and 7 are enlarged detail views illustrating the method of operation.

Like parts are indicated by similar characters of reference throughout the several views.

Figure 1:
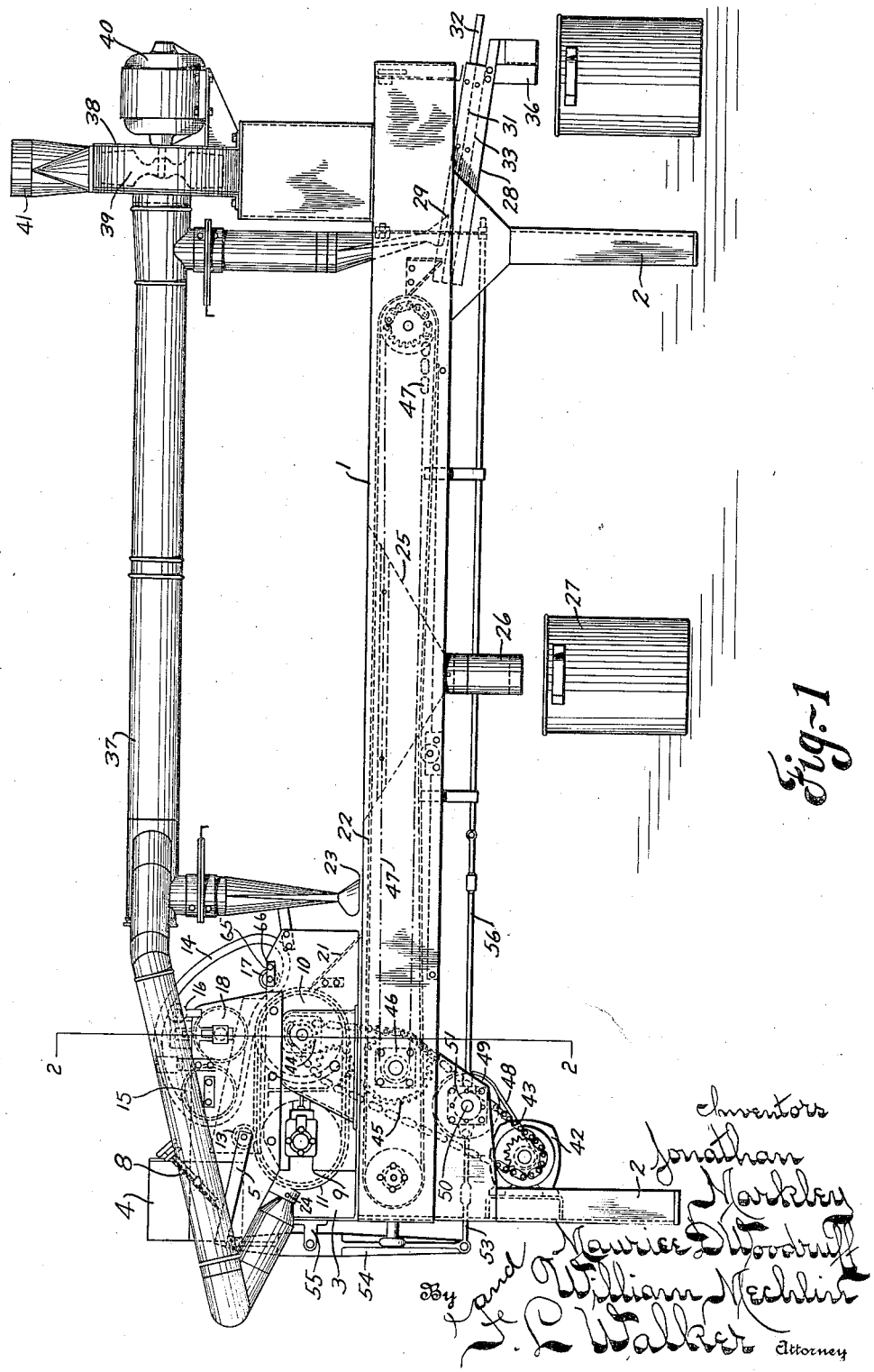
Fig. 1 is a side elevation of a peanut blanching apparatus embodying the present invention and adapted for carrying out the method forming the subject matter hereof.

The apparatus illustrated in the drawings comprises an elongated table like structure 1 supported upon legs 2 and carrying at one end a superstructure 3 in which is located the kernel feeding and skin removing devices.

Located at the top of the superstructure 3 is a hopper 4 to contain a supply of kernels to be blanched from which the kernels are automatically fed to the blanching devices. The bottom of the hopper or feeder consists of a vibratory inclined tray 5 having therein a succession of closely adjacent, parallel longitudinally disposed channels or grooves 7 through which the kernels leave the hopper in aligned relation. An adjustable gate 8 overhanging the vibratory aligning tray regulates the flow of kernels from the hopper permitting them to pass therefrom only when arranged in single tier within the grooves or channels 7 of the tray.

Extending about a pair of parallel rotary drums 9 and 10 mounted in the superstructure 3 is an endless longitudinally corrugated belt or apron 11 of rubber or other resilient, yielding, tenacious material. The exposed surface of the belt or apron contains a succession of longitudinal parallel V-shaped grooves 12 sufficiently deep to approximately contain a kernel of maximum size, when pressed therein. The discharge end of the inclined vibrator feeder tray 5 overhangs the belt or apron 11 with the channels 7 of the tray in registry with the grooves 12 of the belt, into which the kernels are progressively discharged. To maintain this aligned relation of the tray channels 7 and belt grooves 12, the tray is loosely or flexibly mounted for limited lateral adjustment and is provided with beveled rollers 13 at its extremity which engage and track in the outermost grooves of the belt. Any lateral variation or creep of the belt 11 upon the drum will carry the discharge end of the tray with it and maintain the registering relation of the respective grooves. The kernels being longitudinally disposed in the feeder tray channels are discharged therefrom in like longitudinally disposed relation into the belt grooves 12.

Overlying the belt 11 is a second endless belt 14 which conforms closely to the path of travel of the belt 11 about a portion of the periphery of the drum 10 and follows a circuitous path about spaced guide rollers 15, 16 and 17. The pressure belt 14 is somewhat larger than the path defined by the spacing of the several guide rollers and is carried along by its contact with the belt 11. Immediately over the drum 10 is a vertically adjustable pressure roll 18 under which the pressure belt 14 passes into contact with the grooved carrier belt 11. The roll 18 is adjustably mounted in the superstructure 3 to enable the pressure on the passing kernels to be varied. The overlying pressure belt 14 is preferably smooth on its exterior contacting face, but as hereafter described may be longitudinally ribbed. Both belts are of relatively soft resilient cushion material. The V grooves 12 in the belt or apron are of such angularity that the kernels deposited therein engage the opposite sides of the V shaped grooves a short distance below their tops as indicated in Fig. 6 with a considerable portion of each kernel projecting above the level of the belt. Upon pressure being applied to the kernels by the overlying pressure belt 14 the kernels are thrust more deeply into the V-shaped grooves 12. The sides of the groove being of resilient cushion character will yield but will exert a squeezing effect upon the depressed kernel. The frictional engagement of the tenacious faces of the groove 12 with the skin or covering of the kernel will tend to resist relative movement of the kernel within the groove. Such frictional resistance between the face of the groove and the skin being greater than the adherence of the interior of the skin to the kernel, the kernel will tend to depress relative to the skin which is retarded by frictional contact with the sides of the groove. Such pressure of the kernel on the under portion of the skin which is thus subject to tension causes the skin to rupture along the underside of the kernel. The skin being once ruptured is free to separate from the kernel.

During the period of depression of the kernels into the grooves by the overlying pressure belt 14 they are being carried along by the travel of the grooved apron or belt 11 which is positively driven from a suitable power source. Passing beyond the contact area of the belts 11 and 14 the kernels and skins are dislodged from the grooves of the belt 11 and descend by gravity over an inclined plate 21 onto a travelling sorting apron 22. The pressure belt is of such size as to possess a considerable degree of slack. By adjustment of the rollers 17 and 18 it may be made to conform to the grooved conveyor belt 11 through a greater or less range of travel, thereby subjecting the kernels to a more or less sever action as may be necessary for rupturing the enclosing skins.

Immediately beyond the point of discharge from the blanching belts the kernels are carried by the sorting apron 22 beneath an intake nozzle 23 of an air suction system by which the skins and chaff are withdrawn leaving the cleaned kernels on the travelling sorting apron 22. As the grooved blanching belt 11 returns about the drum 9 it passes another intake nozzle 24 of the air suction system by which any skins and chaff still adhering to the belt are withdrawn before the belt again receives a further supply of kernels from the feeder tray 5.

After having passed the suction intake nozzle 23 by the travel of the sorting table apron, the denuded kernels are carried past stations at opposite sides of the table where operatives hand pick stones and foreign material, discolored, misshapen, and otherwise non-commercial kernels from the travelling supply upon the apron 22.

The rejected kernels and other refuse are deposited in hopper like receptacles 25 which parallel the travelling apron 22 at opposite sides thereof from which chutes 26 extend to a waste receptacle 27. The kernels are discharged from the end of the travelling sorting table apron 22 onto a vibratory riddle 28. At this point of discharge the kernels are again subjected to the suction influence of the air blast through the dependent nozzle 29 by which any remaining particles of chaff or skins are withdrawn.

Falling onto the vibratory riddle 28 the kernels and pieces of kernel are separated or graded by a series of superposed relatively spaced screens or sieves of different size mesh or openings. The upper screen 31 is of such size as to retain the larger size whole kernels which are discharged from a spout 32. Such screen 31 permits passage therethrough of the half kernels and smaller sizes of whole kernels which are delivered to the side of the machine.

The detached hearts and particles or broken kernels falling through the sieve or screen 33 are collected by the bottom of the grader 28 from which they are discharged through a spout 36 at the side of the apparatus.

The several air suction nozzles, 23, 24 and 29 all communicate with a flue 37 extending above the level of the machine in a longitudinal direction and communicate with a fan chamber. Within the chamber 38 is a rotary fan 39 driven by a motor 40 which discharges the skins and litter withdrawn from the passing kernels upwardly through a stack 41 to a suitable collector not shown.

The mechanism is actuated from a power motor 42 located beneath the sorting table and connected by a drive chain 43 with a sprocket 44 upon the shaft of the blanching belt drum 10 to drive such belt. Intermediate the power motor 42 and the drum sprocket 44 the chain 43 operatively engages a sprocket 45 with which is associated a smaller sprocket 46 connected by a drive chain 47 with a corresponding sprocket upon a drive roller of the travelling sorting apron 22 at the discharge end of the apparatus. By applying the power at the outlet end of the sorting apron the top run of such traveling apron is maintained tight at all times.

The driving motor 42 is further connected by a drive belt 48 with a pulley 49 upon a shaft 50 extending transversely of the apparatus beneath the sorting table. The shaft 50 carries at midlength position an eccentric 51 from which reciprocatory rods extend in opposite directions. One of the rods 53 is connected with a rocking lever 54 pivoted to a bracket 55 projecting from the end of the frame, which lever 54 is in turn connected with the vibratory feeder tray 5 to transmit thereto a reciprocatory motion by which the kernels are shaken into aligned positions in the channels 7 and caused to travel down such channels into the grooves 12 of the bleaching belt 11.

The other rod 56 connected with the eccentric is operatively connected with the grading riddle at the discharge end of the sorting table and transmits thereto a vibratory motion by which the kernels are agitated over and through the respective screens.

The V-shaped grooves 12 in the blanching belt 11 are of a size to receive kernels of a standard size. If kernels of other grades or sizes are to be blanched the belts may be changed for others having grooves of suitable size. However, in lieu thereof, in the event that kernels of smaller size are to be operated upon, a longitudinally corrugated presser belt 57 may be substituted for the plain belt 14. Such corrugated belt 57 is so disposed relative to the blanching belt 11 that the longitudinal ribs 58 of the corrugated presser belt register with the grooves 12 and enter thereinto sufficient distance to apply the necessary pressure to smaller kernels which may set deeper within the grooves. The effective action in tensioning the skin across the groove and pressing the kernel against the tensioned area with sufficient force to rupture the skin is as before described. The method by which the enclosing skins are ruptured preparatory to being dislodged from the enclosed kernels is diagrammatically illustrated in Figs. 6 and 7. As the kernel 20 previously aligned with the V-shaped groove 12 drops from the feeder tray into the groove it seats itself on the opposite inclined faces of the groove adjacent to the top of the belt with a considerable portion of the kernel 20 projecting above the level of the belt. As the belt advances bringing the kernel beneath the pressure belt 14 the latter presses the kernel deeper within the groove and in so doing the sides of the groove are somewhat distorted which causes a squeezing effect and increases the frictional engagement of the skins with the side of the groove at the opposite sides of the kernel without, however, subjecting the kernel to a breaking pressure. The downward pressure on the exposed top of the kernel causes the portion of the skin extending from one side to the other beneath the kernel and bridging the groove to be subjected to tension strain beyond the tensile strength of this portion of the skin. As result the underside of the enclosing skin is ruptured by the kernel being thrust therethrough while the side portions of the skin are frictionally held by their contact with the tenacious side walls of the groove.

The skins being broken it requires merely agitation to separate the kernels from the ruptured skins, which occurs as the kernels are carried through the apparatus.

Figure 2:
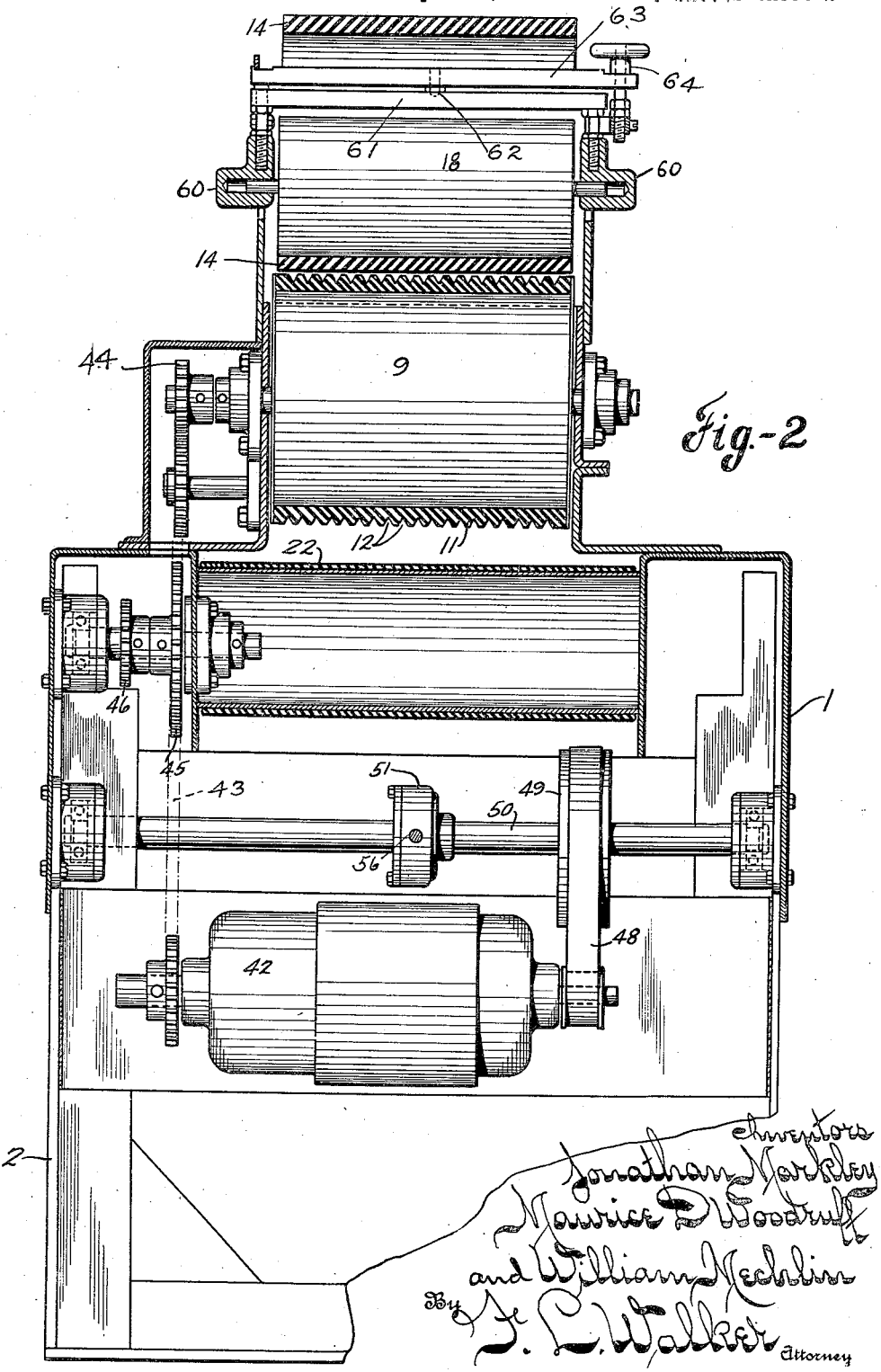
Fig. 2 is a vertical transverse sectional view on line 2—2, of Fig. 1.

The pressure roll 18 is vertically adjustable, as is also the guide roller 17, to vary the degree of pressure applied to the passing kernels, and the extent of the contacting paths of the belts. As shown in Fig. 2 the pressure roller 18 is journaled in bearing 60 in the extremities of an adjustable yoke 61. The yoke 61 is fulcrumed at 62 upon an adjustable pressure bar 63 controlled by an adjusting screw 64. The yoke and pressure roller may be subject to yielding tension of springs in lieu of the pressure screw 64.

The roller 17 is carried by swinging arms 65 which may be secured in any desired position of oscillatory adjustment by tightening of the nuts 66 upon the pivotal connections of the arms (Fig. 1). By raising and lowering the guide roller 17 the pressure belt 14 may be made to conform to the conveyor belt 11 through a greater or less range of travel thereby subjecting the kernels to more or less severe blanching action. The skins of some kernels may be found more tough and of greater resistance to rupture than others. To minimize breakage and halving of the kernels it is desirable to employ as little pressure through as short a period of action as possible. The capability of the rollers 17 and 18 for adjustment enables the apparatus to be adjusted according to the condition and character of the kernels to be blanched.

It is to be noted that the exterior surface of the belt 11 in passing about the roller 10 is in tension or subject to stretching effect, whereas the contacting concave surface of the overlying belt is in compression. This tendency of the respective belts to exert upon the kernels opposing forces, however slight, further assists in straining or tensioning the skins to their breaking point.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. A blanching apparatus for nut kernels and the like, including feeding means, cooperating relatively movable presure devices to which the kernels are fed and between which the enclosing skins of the kernels are subjected to tension strain to their bursting point in a direction transversely to the direction of movement of the pressure devices, one of the pressure devices having a resiliently walled groove therein of greater depth than half the diameter of the fed nut kernel and which diminishes in width towards its bottom, and into which the nut kernels are forced by pressure devices against frictional resistance of the nut kernel enclosing skins on the approaching sides of the groove sufficiently to produce bursting tension strain on the skin, suction means for withdrawing the bursted skins from the kernels, a travelling sorting table over which the denuded kernels are carried for inspection, and a grader into which the kernels as discharged from the sorting table and wherein the kernels and portions thereof are assorted as to size.

2. A blanching apparatus for nut kernels and the like, including kernel feeding means, a resilient support for the kernels engaging their enclosing skins at opposite sides of the kernel only including a groove of greater depth than half the diameter of a fed nut kernel and which diminishes in width towards its bottom, means for applying pressure to the kernels intermeriate and in a direction normal to a plane through the points of engagement of the support with the skins to thereby force the kernels downwardly in the groove and tension to bursting strain the portions of the skins intermediate such points of engagement and on the side of the kernel opposite that to which pressure is applied, and means for separating the bursted skins from the denuded kernels.

3. A blanching apparatus for nut kernels and the like, including feeding means, an expansible and contractible groove of greater depth than half the diameter of a fed nut kernel and dimininshing in width towards its bottom and into which the nut kernels are fed, the approaching walls of the groove forming spaced frictional contact means engageable with the enclosing skins at opposite sides of the kernels only and between which the kernels are bridged, and means for moving the nut kernels toward the bottom of the groove to subject a portion of the enclosing skin to bursting tension, and means for separating the bursted skins and denuded kernels.

4. A blanching apparatus for nut kernels including a kernel feeding means, a resilient cushion member having recesses of greater depth than half the diameter of a fed nut kernel and converging side walls in which the kernels are received, the sides of which frictionally engage the enclosing skins of the kernels at separated points, pressure means for depressing the kernels into such recesses against the tension of a portion of the enclosing skin until the skins are ruptured, and means for separating the ruptured skins from the denuded kernels.

5. In an apparatus of the character described, a kernel feeding means, a travelling belt of resilient material having therein longitudinally disposed grooves of greater depth than half the diameter of the fed nut kernel and converging side walls and within which the kernels are received in bridging relation, the converging sides of the grooves having tenacious frictional engagement with the enclosing skins of the kernels at separated points, and pressure means for thrusting the kernels more deeply into the grooves in the direction of convergence of the side walls of the grooves against the resistance of groove bridging portions of the skins until the skins are ruptured, and means for separating the ruptured skins from the denuded kernels.

6. A nut kernel blanching apparatus including a kernel feeding means, a pair of travelling contacting belts between which the kernels are engaged, one of said belts having resiliently walled recesses therein of greater depth but less width than the fed kernels and into which the kernels are pressed by the other belt, the sides of the recesses having frictional engagement with the enclosing skins of the kernels at separated points and the opposing belt serving by pressure upon the kernels to tension the enclosing skins to bursting point between the points of frictional engagement with the sides of the recesses, and means for separating the bursted skins from the denuded kernels.

7. In a blanching apparatus for nut kernels, the combination with means for rupturing the enclosing skins of the kernels including an expansible and contractible groove of greater depth than half the diameter of a nut kernel to be blanched and with converging side walls to form spaced frictional contact means engageable with the enclosing skins at opposite sides of the kernels only and between which the kernels are bridged, and means for relatively moving the frictional contact means and the kernels to subject a portion of the enclosing skin to bursting tension, of a kernel feeding means including a supply compartment and a vibratory tray receiving kernels from the supply compartment, parallel longitudinal channels in the bottom of the tray in which the kernels are aligned by the vibratory motion and means for vibrating the tray.

8. In a blanching apparatus for nut kernels, a recessed travelling element of resilient material wherein the recesses are of greater depth than half the diameter of a nut kernel to be blanched and have converging side walls to receive the kernels forming a support for the kernels which engages their enclosing skins on opposite sides of each kernel only, means for applying pressure to the kernels in a direction transversely to the line of travel of the recessed element to thereby force the kernels into the recesses and tension to bursting strain the portions of the skins intermediate the points at which the kernels are supported, a vibratory tray from which the kernels are discharged to said travelling recessed element, aligning channels in the bottom of the tray, means for maintaining alignment of the channels of the tray with recesses of the travelling element, means for vibrating the tray and means for advancing the recessed element relative thereto.

9. In an apparatus for blanching nut kernels and the like, including supporting a nut kernel at substantially diametrically opposed points and for an expansible and contractible recess of greater depth than half the diameter of a nut kernel to be blanched and having converging side walls mechanically applying frictional pressure to the skin of the kernel at the points of support, and mechanical means for forcing the kernel deeper into the recess past the points of support and application of frictional pressure against the tension of a portion of enclosing skin bridging said points under pressure greater than the tensile strength of such portion of the skin whereby the skin is ruptured thereby.

10. In an apparatus for blanching nut kernels, the combination with means for rupturing the enclosing skins of the kernels including spaced frictional resilient contact means formed by the converging walls of a recess deeper than half the diameter of the kernels to be blanched and engageable with the enclosing skins at spaced points on the kernels and between which the kernels are bridged, means for relatively moving the frictional contact means and the kernels to subject a portion of the enclosing skins to bursting tension, and means for thereafter separating the ruptured skins from the denuded kernels, of a hopper to receive a supply of kernels to be blanched, an inclined vibratory tray located beneath the hopper, the bottom of the tray being longitudinally corrugated, said hopper having an outlet which regulates the flow of kernels therefrom onto the tray to a single tier, and means for vibrating the tray for aligning the kernels in the channels thereof from which they are discharged to the skin rupturing means.

11. In an apparatus for blanching nut kernels, the combination with means for rupturing the enclosing skins of the kernels including spaced frictional resilient contact means formed by the converging walls of a recess deeper than half the diameter of the kernels to be blanched and engageable with the enclosing skins at spaced points on the kernels and between which the kernels are bridged, means for relatively moving the frictional contact means and the kernels to subject a portion of the enclosing skins to bursting tension, and means for thereafter separating the ruptured skins from the denuded kernels, including a supply compartment from which the kernels are fed to the skin rupturing means and kernel aligning means for automatically positioning the kernels in predetermined relation preparatory to their reception by the skin rupturing means.

12. In an apparatus for blanching nut kernels, the combination with means for rupturing the enclosing skins of nut kernels including spaced frictional resilient contact means formed by the converging walls of a recess deeper than half the diameter of the kernels to be blanched and engageable with the enclosing skins at spaced points on the kernels and between which the kernels are bridged, means for relatively moving the frictional contact means and the kernels to subject a portion of the enclosing skins to bursting tension, and means for feeding the kernels thereto, of means for separating the loosened skins from the denuded kernels, and a grader into which the denuded kernels and pieces thereof are discharged including superposed spaced sieves of different capacities, a vibratory frame in which the sieves are carried, means for vibrating the frame and delivery spouts leading from the different sieves whereby the whole kernels and half kernels are separately delivered and pieces of lesser size than half kernels are delivered apart from the whole and half kernels.

13. In an apparatus for blanching nut kernels, the combination with means for rupturing the enclosing skins of nut kernels including spaced frictional resilient contact means formed by the converging walls of a recess deeper than half the diameter of the kernels to be blanched and engageable with the enclosing skins at spaced points on the kernels and between which the kernels are bridged, means for relatively moving the frictional contact means and the kernels to subject a portion of the enclosing skins to bursting tension, feeding means for delivering the kernels thereto, of a travelling sorting table onto which the kernels and ruptured skins are delivered, and a suction system including a nozzle extending in proximity to the sorting table for removal of skins from among the denuded kernels and grading means for assorting the whole kernels, half kernels and pieces thereof upon delivery from the sorting table.

14. In an apparatus for blanching nut kernels, the combination with means for rupturing the enclosing skins of nut kernels including spaced frictional resilient contact means formed by the converging walls of a recess deeper than half the diameter of the kernels to be blanched and engageable with the enclosing skins at spaced points on the kernels and between which the kernels are bridged, means for relatively moving the frictional contact means and the kernels to subject a portion of the enclosing skins to bursting tension, feeding means for delivering the kernels thereto, of a travelling sorting table onto which the kernels and ruptured skins are delivered, and a suction system including a nozzle in proximate relation with the point of delivery of intermixed ruptured skins and denuded kernels onto the sorting table for removal of skins from among denuded kernels.

15. In an apparatus of the character described, the combination with means for rupturing the skins of nut kernels including spaced frictional resilient contact means formed by the converging walls of a recess deeper than half the diameter of the kernels to be blanched and engageable with the enclosing skins at spaced points on the kernels and between which the kernels are bridged, means for relatively moving the frictional contact means and the kernels to subject a portion of the enclosing skins to bursting tension, and means for feeding the kernels thereto, of an air blast system including a nozzle past which the denuded kernels and bursted skins are carried by which they are separated, and grader means for the denuded kernels and parts thereof.

16. In an apparatus for blanching nut kernels, the combination with means for rupturing the enclosing skins of nut kernels including spaced frictional resilient contact means formed by the converging walls of a recess deeper than half the diameter of the kernels to be blanched and engageable with the enclosing skins at spaced points on the kernels and between which the kernels are bridged, means for relatively moving the frictional contact means and the kernels to subject a portion of the enclosing skins to bursting tension, feeding means for delivering the kernels thereto, of a travelling sorting table onto which the kernels and ruptured skins are delivered, and a suction system including a nozzle in proximate relation with the point of discharge of the denuded kernels from the sorting table for removal of loosened skin particles and chaff therefrom.

17. In an apparatus for blanching nut kernels, the combination with means for rupturing the enclosing skins of nut kernels including spaced frictional resilient contact means formed by the converging walls of a recess deeper than half the diameter of the kernels to be blanched and engageable with the enclosing skins at spaced points on the kernels and between which the kernels are bridged, means for relatively moving the frictional contact means and the kernels to subject a portion of the enclosing skins to bursting tension, feeding means for delivering the kernels thereto, and a suction system including a nozzle associated with the skin rupturing means for removal therefrom of adhering skin portions preparatory to delivery thereto by the feeding means of nut kernels to be blanched.

18. In an apparatus for blanching nut kernels, a travelling longitudinally corrugated resilient member having grooves therein which gradually diminish in width toward their bottoms and are deeper than the kernels to be deposited therein, means for depositing kernels in aligned relation within the grooves of said member, a pressure member urging the kernels more deeply within the grooves of the corrugated member against the frictional resistance of the enclosing skins on the sides of the grooves under pressure sufficient to rupture the skins of the nuts, and means for separating the ruptured skins from the denuded nuts.

19. In an apparatus for blanching nut kernels and the like, means for rupturing the enclosing skins of the nut kernels including spaced frictional resilient contact means formed by the converging walls of a recess deeper than half the diameter of the kernels to be blanched and engageable with the enclosing skins at spaced points on the kernels and between which the kernels are bridged, means for relatively moving the frictional contact means and the kernels to subject a portion of the enclosing skins to bursting tension, means for feeding the kernels thereto, a travelling sorting table onto which the ruptured skins and denuded kernels are discharged for inspection, an air blast system including nozzles past which the nut kernels and loosened skins are carried by the travel of the sorting table whereby the skins are separated from the kernels, and a receptacle in proximity to the margin of the travelling sorting table receiving refuse too heavy to be segregated by the air blast and manually removed from the sorting table.

20. In an apparatus for blanching nut kernels, travelling resilient pressure applying members between which the kernels are fed, at least one of the members being provided with a groove parallel to the line of travel of the member which gradually diminishes in width toward its bottom and is of greater depth than half the diameter of the kernels being blanched and into which the kernels are forced under pressure to produce a wiping action on the kernels in a direction transversely to the line of travel of the pressure applying members.

21. A blanching apparatus for nut kernels and the like including superposed travelling resilient members coextensive throughout a portion of their length, one of said members having kernel receiving grooves which are deeper than half the diameter of the kernels being blanched and which progressively decrease in width from the surface of the resilient member inwardly, and into which the kernels are moved by pressure created by passage of the kernels between the superposed members to effect sufficient tension on the skins for creating a rupture therein.

22. A blanching apparatus for nut kernels and the like, including superposed travelling resilient members travelling at the same rate of speed and coextensive throughout a portion of their length, one of said members having kernel receiving grooves which are deeper than half the diameter of the kernels being blanched and which progressively decrease in width from the surface of the resilient member inwardly, and into which the kernels are moved by pressure created by passage of the kernels between the superposed members to effect sufficient tension on the skins for creating a rupture therein.

23. In a nut kernel blanching apparatus, a traveling kernel support, an expansible and contractible groove therein greater in depth than the thickness of a nut kernel and gradually diminishing in width toward its bottom and a pressure member cooperating with the traveling kernel support to urge the nut kernels downwardly into the groove against the frictional resistance of the nut kernel enclosing skins on the approaching sides of the groove with sufficient pressure to rupture the enclosing skins.

24. The method of blanching nut kernels, which includes feeding the nut kernels in one direction while resiliently supporting them from their opposite sides only, simultaneously moving the kernels under pressure while so supported in a direction normal to the direction of feed over a distance substantially equal to half the diameter of the kernels and simultaneously exerting a gradually increasing tensioning force on the enclosing skin of the kernels to rupture the skin.

25. The method of blanching nut kernels, which includes feeding the nut kernels in one direction while resiliently supporting them from their opposite sides only, simultaneously moving the kernels under pressure while so supported in a direction normal to the direction of feed over a distance substantially equal to half the diameter of the kernels and simultaneously exerting a gradually increasing tensioning force and a wiping action on the enclosing skin of the kernels to rupture the skin.

26. The method of blanching nut kernels, which includes conveying the nut kernels in one direction while resiliently supporting them from their opposite sides only, simultaneously moving the kernels under pressure while so supported in a direction normal to the first named movement of the kernels over a distance at least equal to the diameters of the kernels to thereby exert tensioning force on the enclosing skin of the kernels to rupture the skin.

27. The method of blanching nut kernels which includes feeding the nut kernels in one direction while resiliently supporting them from their opposite sides only, simultaneously moving the kernels under pressure while so supported in a direction normal to the direction of feed over a distance at least equal to the diameter of the kernels, and simultaneously exerting a gradually increasing tensioning force and a wiping action on the enclosing skin of the kernels to rupture the skin.

JONATHAN MARKLEY.
MAURICE D. WOODRUFF.
WILLIAM MECHLIN.

CERTIFICATE OF CORRECTION.

Patent No. 2,143,020. January 10, 1939.

JONATHAN MARKLEY, ET AL.

It is hereby certified that error appears in the printed specification of the above numbered patent requiring correction as follows: Page 2, first column, line 20, for the word "vibrator" read vibratory; page 3, first column, line 28, for "bleaching" read blanching; and second column, line 72, claim 1, for "presure" read pressure; page 4, first column, line 10, same claim, for "skin" read skins; line 25-26, claim 2, for "intermeriate" read intermediate; and second column, lines 59 to 61 inclusive, claim 9, strike out the words "supporting a nut kernel at substantially diametrically opposed points and for"; line 64, same claim, after "walls" insert for supporting a nut kernel at substantially diametrically opposed points and; and that the said Letters Patent should be read with this correction therein that the same may conform to the record of the case in the Patent Office.

Signed and sealed this 14th day of March, A. D. 1939.

Henry Van Arsdale.

(Seal) Acting Commissioner of Patents.